March 9, 1954     T. C. WHITEHEAD     2,671,630
REARVIEW MIRROR MOUNTING
Filed Feb. 21, 1949
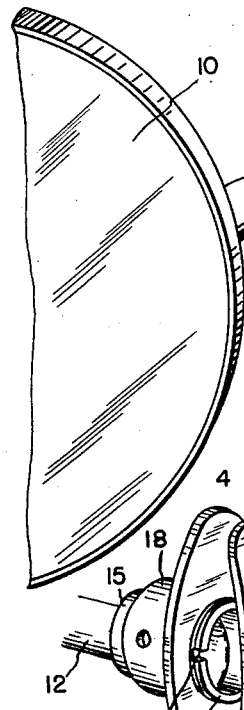
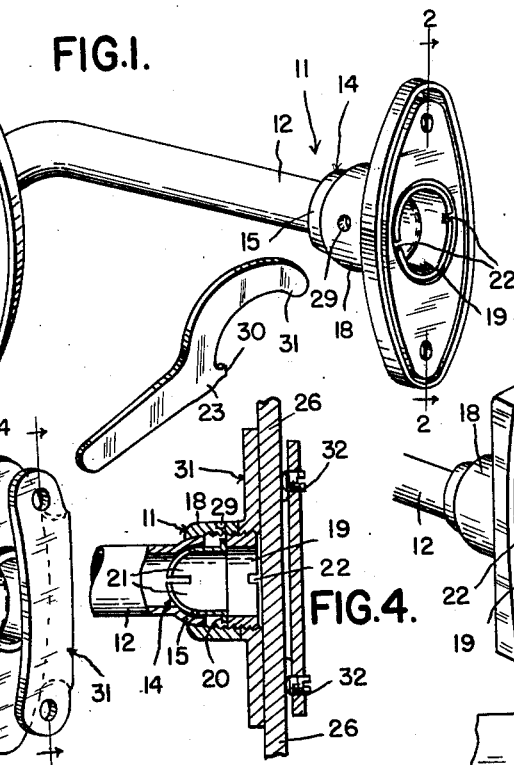
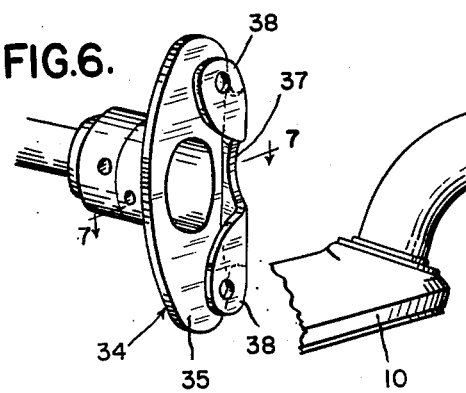
INVENTOR.
THOMAS C. WHITEHEAD
BY
ATTORNEYS Patented Mar. 9, 1954

2,671,630

UNITED STATES PATENT OFFICE 2,671,630

REARVIEW MIRROR MOUNTING

Thomas C. Whitehead, Detroit, Mich., assignor to Whitehead Stamping Company, Detroit, Mich., a corporation of Michigan Application February 21, 1949, Serial No. 77,631

1 Claim. (Cl. 248—226)

This invention relates generally to rear view mirrors, and refers more particularly to improvements in mirrors of the type adapted for mounting on either or both sides of a vehicle exteriorly of the body.

Mirrors of the above general type are used extensively to augment the usual interior rear view mirror to afford a wide view of the traffic in rear of the vehicle, and are highly satisfactory for this purpose. However, one serious objection to the usual side mirror is that the design thereof renders it possible for unauthorized persons to readily remove the same. Also in many types of side mirrors, no provision is made for varying the resistance of the frictional universal coupling ordinarily provided for adjustably connecting the mirror backing to its mounting arm and difficulty is frequently experienced in maintaining the mirror in its desired position. Road shocks as well as vehicle vibration tend to move the mirror relative to its mounting arm, necessitating frequent readjustment of the mirror which is inconvenient due to the inaccessibility of the mirror from a position within the vehicle.

One of the objects of this invention is to provide a rear view mirror with a side mounting of a design which not only discourages theft, but in addition, is composed of a relatively few simple parts capable of being inexpensively manufactured, assembled and installed.

Another object of this invention is to provide a rear view side mirror having a frictional universal coupling with a mounting bracket and having means for not only adjusting the frictional resistance afforded by the coupling, but for also rotatably adjusting the mirror relative to its mounting bracket.

A further object of this invention is to provide a rear view side mirror with a frictional universal coupling having a spherically shaped part slotted to possess a degree of resiliency and held in bearing contact with a spherically shaped socket by an intermediate part adjustable to vary the extent of friction provided by the coupling.

A still further object of this invention is to provide a supporting arm having provision at the outer end for attachment to a mirror assembly and having a tubular part at the inner end contoured to form a spherically shaped socket. The socket is adapted to have a bearing engagement with a spherically shaped head, and the latter is urged into frictional contact with the socket by a part which is adjustably mounted to enable varying the pressure contact between the socket and head.

The foregoing as well as other objects will be made more apparent as this description proceeds, especially when considered in connection with the accompanying drawing, wherein:

Figure 1 is a perspective view showing the inner end of the mirror supporting arm, and illustrating the universal connection between the arm and a mounting bracket;

Figure 2 is a sectional view taken on the line 2—2 of Figure 1;

Figure 3 is a fragmentary perspective view showing a different type of clamping bracket;

Figure 4 is a sectional view taken on the line 4—4 of Figure 3;

Figure 5 is a fragmentary perspective view showing still another form of clamping bracket;

Figure 6 is a fragmentary perspective view of a further embodiment of this invention;

Figure 7 is a sectional view taken on the line 7—7 of Figure 6; and

Figure 8 is a fragmentary sectional view of still another embodiment of this invention.

The various types of mountings selected herein for the purpose of illustrating the present invention are particularly adapted for use in connecting a rear view mirror to one or both sides of a vehicle body.

With the above in view, reference is made more in detail to Figures 1 and 2 of the drawing, wherein the numeral 10 indicates the backing provided for an orthodox rear view mirror, and the numeral 11 designates a mounting for the mirror. The mounting 11 comprises generally a supporting arm having the outer ends suitably fixedly secured to the mirror backing 10, an attaching bracket 13, and a universal connection 14 of the friction type between the inner end of the arm and the bracket 13. The arm 12 is tubular in cross section, and the inner end of the arm is enlarged and contoured to form a spherically shaped socket 15. The inner surface of the socket 15 has a bearing engagement with a spherically shaped head 16 formed on the outer end of a shell 17. As will be presently set forth the shell is held in a position wherein the spherically shaped head 16 has a frictional bearing contact with the spherically shaped seat 15 to enable rotatably as well as angularly adjusting the mirror supporting arm 12 relative to the bracket 13.

Surrounding the socket portion 15 is a sleeve 18 having the outer end spun or otherwise flared inwardly to have a bearing contact with the exterior surface of the spherically shaped socket 15. The sleeve 18 projects inwardly beyond the inner end of the shell 17 and is internally threaded for threadably engaging a collar 19. The outer edge of the collar 19 abuts a radially outwardly extending annular flange 20 on the inner end of the shell 17, and serves to maintain the spherically shaped head 14 on the shell in bearing engagement with the inner surface of the socket 15. In this connection, it will be noted that the head 16 is formed with slots arranged at right angles to one another and intersecting at the center of the head to provide a plurality of spring fingers 21. The spring fingers 21 contract to some extent upon tightening the collar 19, and apply a gripping action on the inner surface of the socket to frictionally hold the mirror supporting arm 12 in any desired adjusted position. It will be understood that the amount of friction between the spherically shaped head 16 and the socket 15 may be varied by adjusting the collar 19 axially relative to the sleeve 18. For accomplishing this result the inner end of the collar 19 is formed with diametrically opposed notches 22 into which a straight edge of a tool 23 may be inserted to effect the desired adjustment.

The bracket 13 comprises a plate having attaching portions 24 and having a centrally located hub 25 which is internally threaded. In assembly, the hub 25 is aligned with the inner end of the sleeve 18, and also threadably engages the collar 19. The attaching portions 24 of the bracket may be secured to a body panel 26 by self-tapping screws 27, and the latter are preferably concealed by an escutcheon plate 28. The escutcheon plate 28 is centrally apertured to receive the collar 19, and the edge portion thereof surrounding the aperture is clamped in place by the adjacent ends of the sleeve 18 and hub 25.

As stated above the extent of pressure contact between the spherically shaped head 16 on the sleeve 17 and the socket 15 on the inner end of the arm 12 may be varied by adjusting the collar 19. Thus sufficient friction may be provided between the parts to enable holding the mirror supporting arm 12 against accidental movement from any desired adjusted position. After assembly it may be desirable to rotatably adjust the mirror supporting arm 12 relative to the bracket 13, and this is accomplished by rotating the sleeve 18. For this purpose the sleeve 18 is formed with an opening 29 through one side thereof, and the tool 23 has a lug 30 of a size to enable inserting the same into the opening 29. It will also be noted from Figure 1 of the drawing that the tool has a curved arm 31 which is designed to bear against the sleeve 18 beyond the opening 29, and thereby affords the leverage required to rotate the sleeve 18. With the above construction the proper friction may be obtained by adjusting the collar 19 prior to securing the bracket 13 to the body panel 26, and the mirror may be properly positioned by adjusting the sleeve 18 subsequent to securing the bracket 13 to the body panel.

The embodiment of the invention shown in Figures 3 and 4 differs from the one previously described in that the bracket 31 is substantially U-shaped in cross-section, and is adapted to be clamped to one edge of the body panel 26 by set screws 32. This arrangement enables eliminating the escutcheon plate 28 and renders it unnecessary to form openings in the body panel for receiving the fastener elements 27. In all other respects the construction shown in Figures 3 and 4 may be the same as the one previously described, and like reference characters are used to designate corresponding parts.

The embodiment shown in Figure 5 of the drawing merely illustrates still another type of bracket 33 that may be secured to the inner end of the collar 19. This bracket is of a slightly different shape than the bracket 31, but nevertheless, is constructed to enable clamping the same to one edge of the body panel 26 in the same manner as the bracket 31. With the exception of the shape of the bracket the remaining parts of the mounting may be identical to the mounting described in connection with the first embodiment of this invention, and the same reference characters are used to indicate corresponding parts.

The modification shown in Figures 6 and 7 of the drawing illustrates still another type of bracket 34. This bracket comprises a flat plate 35 adapted to rest against the outer surface of a body panel 36 and having an inwardly extending flange 37 at the front edge of a width somewhat greater than the thickness of the body panel 36. The flange, in turn, is formed with laterally extending ears 38 at opposite ends thereof, and these ears overlap the inner surface of the body panel. Each ear 38 has a tapped opening therein for receiving a set screw 39, which serves to clamp the bracket 34 rigidly against the outer surface of the body panel. The bracket 34 also has a centrally arranged hub 40 which projects outwardly from the plate 35, and is adapted to abut the radially outwardly extending flange 20' on a shell 41. The shell 41 is identical to the shell 17 described in connection with the first embodiment of this invention.

The outer surface of the hub 40 is threaded and serves to threadably support the inner end of a sleeve 42 which is also identical to the sleeve 18 described in connection with the first embodiment of this invention. The arrangement is such that the frictional contact between the spherically shaped head 16' on the shell 41 and the socket 15' on the iner end of the arm 12 may be varied by threading the sleeve 42 in one direction or the other on the hub 40. The sleeve is held in any desired adjusted position by a collar 43 threaded on the hub 40 at the inner end of the sleeve 42 and having a recess 43 at one side for engagement by the lug 30 on the tool 23. Thus it will be noted that the frictional resistance incorporated in the universal connection and the angular position of the mirror relative to the supporting arm 12 may be varied subsequent to attaching the bracket 34 to the body panel. It will also be noted that the construction shown in Figures 6 and 7 renders it possible to eliminate the collar 19, and in this respect, simplifies the mounting.

In the modification shown in Figure 8 of the drawing, the universal connection is located between the outer end of the mirror supporting arm 44, and the backing 45 of the mirror. In detail the outer end of the arm 44 is flared outwardly to form a spherically shaped seat 46, and the inner surface of the seat is frictionally engaged by a shell 47 identical to the shell 17 defined with some particularity in connection with the first embodiment of this invention. In Figure 8 of the drawing, however, the radially outwardly extending annular flange 48 on the inner end of the shell 47 seats directly on the mirror backing 45, and is held in position by a sleeve 49. The outer end of the sleeve 49 is reduced to provide a bearing engagement with the spherically shaped exterior surface of the socket 46, and the inner end of the sleeve is formed with circumferentially spaced inwardly extending fingers 50. The fingers 50 project through slots formed in the mirror backing and are bent over the inner surface of the mirror backing to provide lugs 51. During assembly the spring fingers 21 on the spherically shaped head 16 of the shell 47 are contracted so that after the parts are assembled, sufficient frictional resistance is provided between the socket 46 and the head 16 on the shell 47 to hold the mirror backing 45 in any desired adjusted position with respect to the arm 44.

What I claim as my invention is:

Universally adjustable support structure comprising a mounting bracket having an outwardly projecting internally threaded portion, an externally threaded pressure adjusting member received within said internally threaded portion and projecting outwardly beyond the outer end thereof, a friction head extending outwardly from said member and having an outwardly convex spherically shaped friction portion, an internally threaded sleeve carried by the outer end of said member, said sleeve having at its outer end a concave spherically shaped portion, a support arm having a laterally extending concavo-convex flange at one end thereof received between the concave portion of said sleeve and the convex portion of said head, said head being in the form of a separate hollow cup-like element formed of sheet material and having a closed end provided with intersecting slots forming resilient tongues, the outer end of said internally threaded portion providing a seat for said sleeve whereby said sleeve operates as a lock nut in conjunction with said pressure adjusting member.

THOMAS C. WHITEHEAD.

References Cited in the file of this patent

UNITED STATES PATENTS

| Number | Name | Date |
|---|---|---|
| 394,680 | Dawes | Dec. 18, 1888 |
| 470,668 | Fisher | Mar. 15, 1892 |
| 571,799 | Reynolds | Nov. 24, 1896 |
| 947,751 | Long et al. | Jan. 25, 1910 |
| 1,386,959 | Severance et al. | Aug. 9, 1921 |
| 1,404,444 | Kishline | Jan. 24, 1922 |
| 1,685,544 | La Hodny | Aug. 25, 1928 |
| 2,433,594 | Calo | Dec. 30, 1947 |